United States Patent
Litwiller et al.

(10) Patent No.: US 12,400,331 B2
(45) Date of Patent: *Aug. 26, 2025

(54) SYSTEMS AND METHODS FOR MEDICAL IMAGE PROCESSING USING DEEP NEURAL NETWORK

(71) Applicant: GE Precision Healthcare LLC, Wauwatosa, WI (US)

(72) Inventors: Daniel Vance Litwiller, Denver, CO (US); Robert Marc Lebel, Calgary (CA)

(73) Assignee: GE Precision Healthcare LLC, Waukesha, WI (US)

( * ) Notice: Subject to any disclaimer, the term of this patent is extended or adjusted under 35 U.S.C. 154(b) by 784 days.

This patent is subject to a terminal disclaimer.

(21) Appl. No.: 17/570,903

(22) Filed: Jan. 7, 2022

(65) Prior Publication Data

US 2022/0130084 A1     Apr. 28, 2022

Related U.S. Application Data

(63) Continuation-in-part of application No. 16/543,434, filed on Aug. 16, 2019, now Pat. No. 11,257,191.

(51) Int. Cl.
*G06K 9/00* (2022.01)
*G06T 5/50* (2006.01)
(Continued)

(52) U.S. Cl.
CPC .............. *G06T 11/008* (2013.01); *G06T 5/50* (2013.01); *G06T 11/005* (2013.01); *G06V 10/26* (2022.01);
(Continued)

(58) Field of Classification Search
CPC ....... G06T 11/008; G06T 5/50; G06T 11/005; G06T 2207/10072; G06T 2207/10081; G06T 2207/10084; G06T 2207/10088; G06T 2207/10092; G06T 2207/10096; G06T 2207/10116; G06T 2207/10124; G06T 2207/10128; G06T 2207/0012; G06T 2207/20084; G06T 2207/20081; G06T 2207/30004; G06T 2207/10132; G06T 5/002; G06T 5/003; G06T 5/005; G06T 7/0012; G06V 10/26; G06V 10/454; G06V 10/82; G06V 10/98; G06N 3/084;
(Continued)

(56) References Cited

U.S. PATENT DOCUMENTS

| | | | |
|---|---|---|---|
| 11,257,191 B2 * | 2/2022 | Litwiller | G06T 7/0012 |
| 11,341,616 B2 * | 5/2022 | Wang | G06T 7/0012 |

* cited by examiner

Primary Examiner — Duy M Dang

(57) ABSTRACT

Methods and systems are provided for processing medical images using deep neural networks. In one embodiment, a medical image processing method comprises receiving a first medical image having a first characteristic and one or more acquisition parameters corresponding to acquisition of the first medical image, incorporating the one or more acquisition parameters into a trained deep neural network, and mapping, by the trained deep neural network, the first medical image to a second medical image having a second characteristic. The deep neural network may thereby receive at least partial information regarding the type, extent, and/or spatial distribution of the first characteristic in a first medical image, enabling the trained deep neural network to selectively convert the received first medical image.

21 Claims, 9 Drawing Sheets

(51) Int. Cl.
    *G06T 11/00*     (2006.01)
    *G06V 10/26*     (2022.01)
    *G06V 10/44*     (2022.01)
    *G06V 10/82*     (2022.01)
    *G06V 10/98*     (2022.01)
(52) U.S. Cl.
    CPC ............ *G06V 10/454* (2022.01); *G06V 10/82* (2022.01); *G06V 10/98* (2022.01)
(58) Field of Classification Search
    CPC .......... G06N 3/04; G06N 20/00; G06N 20/10; G06N 20/20
    See application file for complete search history.

SYSTEMS AND METHODS FOR MEDICAL IMAGE PROCESSING USING DEEP NEURAL NETWORK

CROSS REFERENCE TO RELATED APPLICATIONS

This Application is a continuation-in-part of U.S. patent application Ser. No. 16/543,434, filed Aug. 16, 2019, which application is herein incorporated by reference.

TECHNICAL FIELD

Embodiments of the subject matter disclosed herein relate to processing medical images, such as magnetic resonance images (MRI), computed tomography (CT) images, X-ray images, ultrasound images, etc., and more particularly, to reducing blurring in medical images using deep neural networks.

BACKGROUND

Medical imaging systems such as magnetic resonance imaging (MRI) systems, computed tomography (CT) systems, positron emission tomography (PET) systems, X-ray systems, ultrasound systems, etc., are widely used to obtain internal physiological information of a subject (e.g., a patient). Medical image data obtained by these imaging modalities may need to be processed for variety of reasons. Such processing may include, for example, reconstruction of image data to produce two or three-dimensional images, removal of artifacts in the image data, classification of images in presence of artifacts, the generation of functional images, and the calculation of motion or flow images. As an example, the image data generated by the imaging modalities may include artifacts such as blurring, ghosting and ringing that severely degrades the diagnostic value of the medical image. Blurring may degrade the resolution and diagnostic quality of medical images, and may further reduce the efficacy of downstream image processing methods which may have been trained on sharp, unblurred medical images. Therefore, exploring deep learning techniques to identify new ways for processing medical images is generally desired.

SUMMARY

The present disclosure at least partially addresses the issues described above. In one embodiment, the present disclosure provides a method for processing medical images using deep neural networks. The method comprises, receiving a first medical image having a first characteristic and one or more acquisition parameters corresponding to acquisition of the first medical image, incorporating the one or more acquisition parameters into a trained deep neural network, and mapping, by the trained deep neural network, the first medical image to a second medical image having a second characteristic. By receiving both a first medical image and an acquisition parameter, wherein the acquisition parameter corresponds to one or more parameters of an imaging system used during acquisition of the first medical image, a deep neural network may be at least partially informed of the type, extent, and/or distribution of the first characteristic present in the first medical image, thereby enabling the deep neural network to map the first medical image to a corresponding second medical image with a greater degree of consistency, even when multiple types of artifacts are present in the medical image, or when the extent/type of artifacts varies by pixel/voxel.

The above advantages and other advantages and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
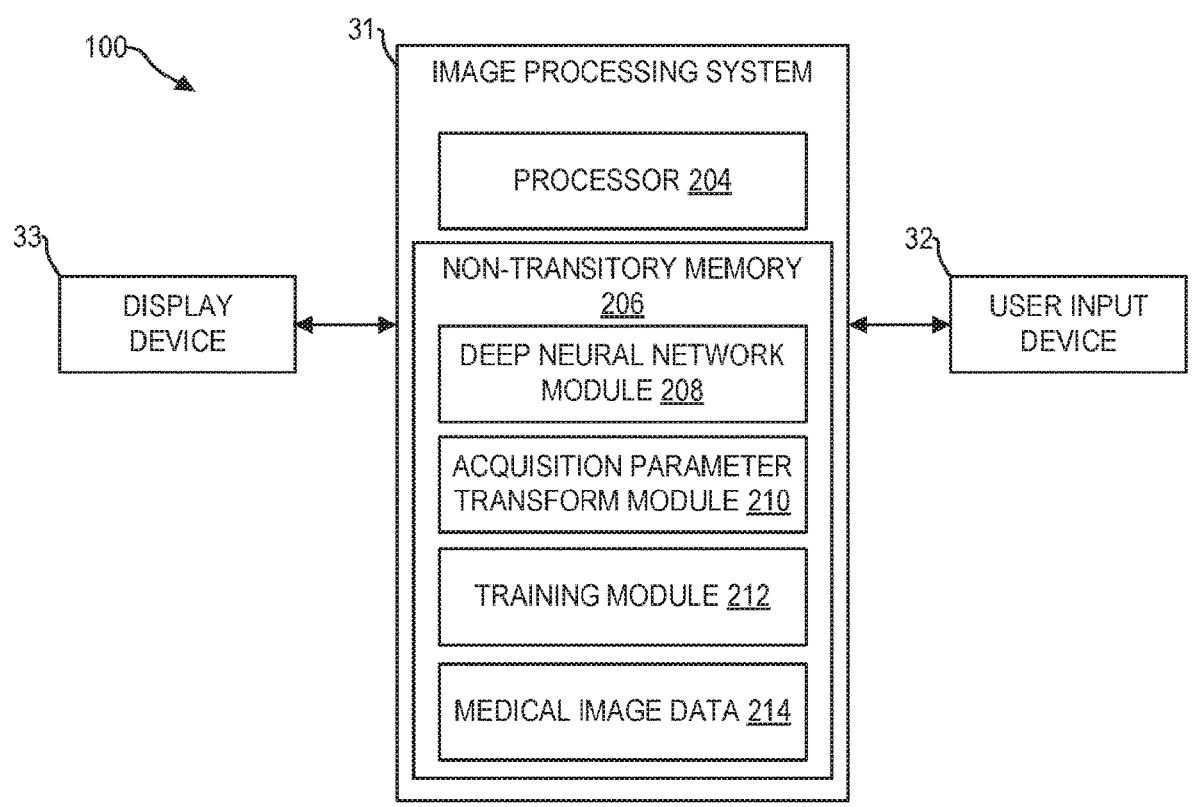
FIG. 1 is a schematic diagram illustrating a system for processing medical images using a deep neural network and an acquisition parameter transform, according to an exemplary embodiment.

The drawings illustrate specific aspects of the described systems and methods for deblurring a medical image using a deep neural network and one or more acquisition parameter transforms. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

For diagnostic purpose, medical images need to be processed from one type to another type. In other words, from a first image having a first type of characteristic, a second image having a second type of characteristic may need to be generated. For example, noisy images may need to be converted to denoised images. Similarly, the image data may need to be converted into segmented images and/or reconstructed images. Detecting objects in one type of image and separating those objects in another type of image may be another application. Further, image classification is another application where the first type of images are converted into a second types of images having labeled parts. In one embodiment, the first type of characteristics may be image having artifacts and second type of characteristics may be artifact free images or images having reduced artifact. The artifacts may be defined as a feature appearing in an image that is not present in the original object. The artifacts may be blurring, ringing, or ghosting effects in the images. Ghosting effect most commonly arise because of physical motion during imaging. Similarly, ringing effect is caused in MR images by the finite k-space sampling and the truncation of high frequency (HF) information at the sampling border.

Blurring generally limits image resolution and degrades diagnostic quality. In one example, blurring in magnetic resonance (MR) images may result from signal modulation during a transient acquisition and/or from variable flip angles and/or relaxation effects during a readout train. One example is T2 blurring in single shot fast spin echo. In another example, in CT imaging, blurring may result as a function of detector size, detector number, source-to-detector distance, collimator geometry, slice thickness, dose, etc. In another example, in PET imaging, blurring may result as a function of detector type, detector geometry, ring radius, positron range (isotope type), depth/line of response, and voxel activity. In yet another example, in ultrasound imaging, blurring may result as a function of transducer (crystal and array) geometry, central frequency, ringdown, spatial pulse length, focal depth, beam apodization, side lobe amplitude, slice thickness, etc. Thus, blurring occurs in a wide range of medical imaging modalities, and may occur as a function of one or more acquisition parameters, where, as used herein, acquisition parameters will be understood to include one or more parameters of the imaging system, the imaged tissue, and/or environmental conditions at the time of acquisition of a medical image (temperature, humidity, ambient magnetic field strength, etc.).

The process of deblurring medical images may be complicated when the type/source of blurring is not known and/or when the extent of blurring varies throughout the image. Take MR as an example. In single shot fast spin echo, blurring may result from the combination of low (and possibly variable) refocusing angles in combination with other factors, including tissue specific relaxation times, view ordering, partial volume effects, $B_1$ field inhomogeneity, etc. In some cases, each voxel/pixel may have a unique blurring function. Deblurring is an ill-posed inverse problem, that is difficult to solve with conventional methods. Further, conventional methods have the drawback of noise amplification, resulting in sharper but noisier images.

The following description relates to various embodiments for generating and processing medical images using deep neural networks, which may at least partially address the above identified issues. In particular, a medical image is acquired by an imaging system with one or more acquisition parameters applied during the acquisition of the medical image. Acquisition parameters may include various imaging system settings used to acquire the medical image. For example, acquisition parameters for an MR image may include one or more of an echo-train-length, a repetition time (TR), an echo time (TE), flip angle, inversion time, etc. Acquisition parameters may further include one or more of a dimension of the medical image, voxel spatial dimensions (the volume of space represented by each voxel in a medical image), sampling pattern, acquisition order, acceleration factor, fat saturation setting (ON or OFF), $B_0$ shim mode selection, RF drive mode selection, physiological signals, physiological state, image reconstruction parameters, and so on. The acquired medical image, which may include a first characteristic, is then processed using a trained deep neural network and one or more acquisition parameter transforms. The one or more acquisition parameters applied during the acquisition of the medical image are input into the acquisition parameter transform, and the output therefrom may be incorporated into the deep neural network in various ways. By incorporating the output of the acquisition parameter transform into the deep neural network, information regarding the type, extent, and distribution of the first characteristic within the medical image may be determined by the deep neural network and used to generate a second medical image having a second characteristic in a more consistent manner, without increasing noise within the medical image.

In some embodiments, the output of the acquisition parameter transform may comprise a point-spread-function based on one or more acquisition parameters, wherein a deconvolution kernel and/or convolution kernel for use in the deep neural network may be based on the point-spread-function determined by the acquisition parameter transform. In this way, the second image having deblurred/sharp medical image characteristic may be produced from corresponding first medical image having blurred medical image characteristic. Further, the deep neural network and acquisition parameter transform (in embodiments in which the acquisition parameter transform comprises a neural network) may be trained before being put in use.

It should be noted that although, the discussion below refers mainly to generating deblurred images from blurred images, the deblurring process is just one application of the present technique. The present technique of using the deep neural network and acquisition parameter transform can be equally applied to other image processing applications such as image segmentation, object detection, denoising, artifact reduction, classification. In all such application, merely the first and second characteristic of images i.e., input and output will be different, but the overall process may remain the same. For example, the first characteristic includes noisy image, image having artifacts, unsegmented image or original image, unlabeled image and the second characteristic includes denoised image, artifact removed image, segmented image, labeled image etc.

As used herein, deblurring is the process of removing blurring artifacts from images, such as blurring caused by defocus aberration or motion blurring, or other types of blurring artifacts. Conventionally, blur may be modeled as the convolution of a (space-varying and/or time-varying) point-spread-function over a hypothetical sharp input image, where both the sharp input image and the point-spread-function may be unknown. As such, deblurring comprises the process of at least partially reversing or mitigating the convolution of the sharp image by one or more point-spread-functions, to obtain or approximate the sharp input image, and is therefore referred to as an inverse problem. Sharp images (or sharp medical images) may therefore be produced by deblurring a blurred image (or blurred medical image), and conversely, blurred images may be produced by introducing one or more blurring artifacts into a sharp image. It will be appreciated that in some conditions, sharp medical images may be acquired directly using an imaging system.

Referring to FIG. 1, a medical image processing system 100 is shown, in accordance with an exemplary embodiment. In some embodiments, the medical image processing system 100 is incorporated into a medical imaging system, for example, an MM system, CT system, X-ray system, PET system, ultrasound system, etc. In some embodiments, the medical image processing system 100 is disposed at a device (e.g., edge device, server, etc.) communicably coupled to the medical imaging system via wired and/or wireless connections. In some embodiments, the medical image processing system 100 is disposed at a separate device (e.g., a workstation) which can receive images from the medical imaging system or from a storage device which stores the images generated by the medical imaging system. The medical image processing system 100 may comprise image processing system 31, user input device 32, and display device 33.

Image processing system 31 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store deep neural network module 208, acquisition parameter transform module 210, training module 212, and medical image data 214. Deep neural network module 208 may include one or more deep neural networks, comprising a plurality of parameters (including weights, biases, activation functions), and instructions for implementing the one or more deep neural networks to receive first medical images having the first characteristic and map first medical image(s) to output, wherein a second medical image having the second characteristic corresponding to the first medical image may be produced from the output. For example, deep neural network module 208 may store instructions for implementing a neural network, such as the convolutional neural network (CNN) of CNN architecture 400, shown in FIG. 4. Deep neural network module 208 may include trained and/or untrained neural networks and may further include various data, or metadata pertaining to the one or more neural networks stored therein.

Non-transitory memory 206 also stores acquisition parameter transform module 210, wherein one or more trained and/or untrained acquisition parameter transforms, and associated data and/or metadata, may be stored. Acquisition parameter transforms may be configured to map acquisition parameters to output, wherein the output may be incorporated into one or more deep neural networks of deep neural network module 208. In some embodiments, an acquisition parameter transform may be configured to predict one or more point spread functions based on one or more input acquisition parameters. In some embodiments, acquisition parameter transforms may comprise analytical functions or models, wherein the function/model receives one or more acquisition parameters as model arguments, and produces an output using the functional mapping from the acquisition parameters. In one example, acquisition parameter transforms may include Fourier transforms for mapping MRI echo sequences to intensity point-spread-functions.

Non-transitory memory 206 may further store training module 212, which comprises instructions for training one or more of the deep neural networks stored in deep neural network module 208 and/or acquisition parameter transforms stored in acquisition parameter transform module 210. Training module 212 may include instructions that, when executed by processor 204, cause image processing system 31 to conduct one or more of the steps of method 700, discussed in more detail below. In some embodiments, training module 212 includes instructions for implementing one or more gradient descent algorithms, applying one or more loss functions, and/or training routines, for use in adjusting parameters of one or more deep neural networks of deep neural network module 208 and/or acquisition parameter transforms of acquisition parameter transform module 210. In some embodiments, training module 212 includes instructions for intelligently selecting training data pairs from medical image data 214. In some embodiments, training data pairs comprise corresponding pairs of images having first and second characteristic of a same anatomical region. In some embodiments, training module 212 includes instructions for generating training data pairs by applying/adding one or more blurring artifacts to sharp medical images to produce a blurred medical image, for example. In some embodiments, the training module 212 is not disposed at the image processing system 31. The deep neural network module 208 includes trained and validated network(s).

Non-transitory memory 206 further stores medical image data 214. Medical image data 214 includes for example, MR images captured from an MRI system, ultrasound images acquired by an ultrasound system, etc. For example, the medical image data 214 may store blurred and/or sharp medical images. In some embodiments, medical image data 214 may include a plurality of training data pairs comprising pairs of blurred and sharp medical images. In some embodiments, medical image data may include one or more blurring point spread functions used to produce a blurred medical image from a sharp medical image.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Image processing system 100 may further include user input device 32. User input device 32 may comprise one or more of a touchscreen, a keyboard, a mouse, a trackpad, a motion sensing camera, or other device configured to enable a user to interact with and manipulate data within image processing system 31. As an example, user input device 32 may enable a user to make a selection of a medical image to perform deblurring on.

Display device 33 may include one or more display devices utilizing virtually any type of technology. In some embodiments, display device 33 may comprise a computer monitor, and may display unprocessed and processed MR images and/or parametric maps. Display device 33 may be combined with processor 204, non-transitory memory 206, and/or user input device 32 in a shared enclosure, or may be peripheral display devices and may comprise a monitor, touchscreen, projector, or other display device known in the art, which may enable a user to view medical images, and/or interact with various data stored in non-transitory memory 206.

It should be understood that image processing system 100 shown in FIG. 1 is for illustration, not for limitation. Another appropriate image processing system may include more, fewer, or different components.

Figure 2:
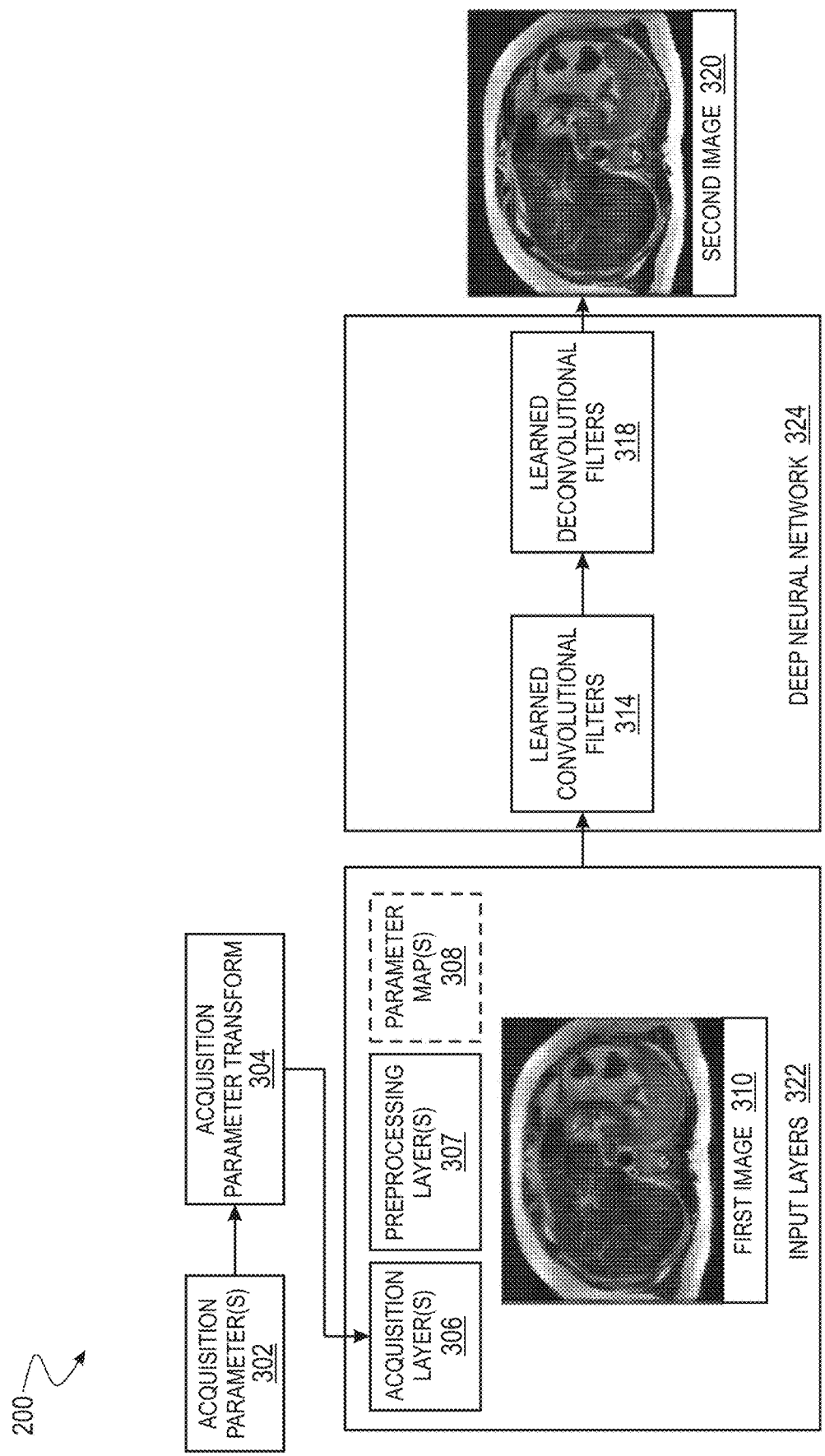
FIG. 2 is a schematic diagram illustrating the layout of a first embodiment of a deep neural network, and an acquisition parameter transform, which can be used in the image processing system of FIG. 1, according to an exemplary embodiment.

Turning to FIG. 2, a schematic of a first embodiment of a image processing system 200 for converting a medical image having a first characteristic into a second image having a second characteristic is shown. Image processing system 200 may be implemented by system 100 to at least partially remove one or more artifacts from an input medical image or to convert the first type of medical image into a second type of medical image. Image processing system 200 serves to illustrate an embodiment of wherein acquisition parameters 302 may be mapped via acquisition parameter transform 304 to output, which is then incorporated into deep neural network 324 via input layers 322 and used to process first image characteristics such as removing one or more artifacts from first image 310. By mapping acquisition parameters to output, and incorporating the output into deep neural network 324, the deep neural network 324 may receive at least partial information regarding the extent, type, and distribution of the first characteristics or artifacts in first image 310, as the artifacts may arise as a function of one or more the acquisition parameters.

The system 200 comprises acquisition parameter transform 304, which receives acquisition parameters 302 as input, and maps acquisition parameters 302 to one or more outputs, wherein the one or more outputs may be incorporated into input layers 322 of deep neural network 324. In some embodiments, acquisition parameter transform 304 comprises a trained neural network, which receives one or more acquisition parameters at an input layer, and maps the one or more acquisition parameters to a first output comprising a plurality of values, wherein the plurality of values may be equal in number to a plurality of pixels or voxels of first image 310 having the first characteristic (e.g., noisy image, blurred image, image having artifacts, unlabeled image etc.). In some embodiments, acquisition parameter transform 304 comprises an analytical mapping, such as an equation or model, which receives one or more acquisition parameters and maps to the first output. In the embodiment shown in FIG. 2, acquisition parameter transform 304 may produce an equal number of output values, as there are pixel or voxel values in first image 310, thereby enabling each of the plurality of pixels or voxels of first image 310 to have at least a single output value from acquisition parameter transform 304 concatenated therewith.

Input layers 322 comprise acquisition layers 306 produced from output of acquisition parameters 304, blurred image 310, and optionally, parameter maps 308, which may include one or more parameter maps of an imaged space, such as a $B_1^+$ field, a $B_o$ field, a T1 map, a T2 map, a gradient nonlinearity map, an encoding error map, a motion map (where the motion/velocity may be estimated or measured), and so on. In one embodiment, a preprocessing layer 307 (optional) may be provided between acquisition layer 306 and parameter maps 308. The preprocessing layer may generate preprocessed images with estimated corrections from the first image. For example, the preprocessing layer may correct for a plurality of T2 values of interest in the first image. In one embodiment, the preprocessing layer provides estimate about expected blurring in the first image, based on known acquisition parameters and/or a tissue of interest. Further, in another embodiment, the preprocessing layer generates images to correct errors in the first image due to Coil sensitivity related artifacts or Motion-induced phase errors in MRI.

Coil sensitivity or Motion-induced phase Input layers 322 are received by deep neural network 324, and mapped to second image 320 having the second characteristic (e.g., denoised image, deblurred image, artifact reduced image, labeled image etc.). Deep neural network 324 comprises learned convolutional filters 314 (learned during a training process and learned deconvolutional filters 318 (learned during a training process). By propagating data from input layers 322 through the convolutional and deconvolutional layers of deep neural network 324, second image 320 is produced.

Acquisition parameters 302 comprise one or more settings used by an imaging system during acquisition of first image 310, and/or one or more physiological attributes of an imaged tissue/patient and/or environmental conditions. For example, if the first image 310 is an MR image, acquisition parameters 302 may comprise one or more of an echo train length, repetition time, echo time, echo spacing, target flip angle(s), sampling pattern, acquisition order, physiological signals, or other parameters/settings used by an MM system during acquisition of first image 310, or relating to an imaged patient. First image 310 is a medical image of an anatomical region, comprising a plurality of values, wherein each value may be referred to as a pixel (for 2D images) or voxel (for 3D images). In one embodiment, first image 310 comprises one or more blurring artifacts, which may generally be described as a spreading/smearing of intensity values across a larger region of the image than the originating/underlying anatomical region. Blurring may be mathematically described as a convolutional of an original, unblurred image, with a point-spread-function, wherein the point-spread-function acts to spread out point sources of intensity from the unblurred image to produce regions of intensity occupying a relatively larger region of the image. As an example, first image 310 comprises an MR image of human abdomen comprising spatially heterogeneous blurring, wherein an extent and/or type of blurring varies based on pixel/voxel within first image 310. That is, first image 310 may comprise a first region having a first degree of blurring, and a second region comprising a second degree of blurring, wherein the first and second degrees and types of blurring are not the same.

Acquisition parameters 302 may comprise a vector or scalar, and may be input into acquisition parameter transforms 304. Acquisition parameter transform 304 is configured to map acquisition parameters 302 to one or more outputs, which may be incorporated into deep neural network 324 and/or concatenated with parametric maps 308, preprocessing layer 307 and first image 310 before being input into deep neural network 324. In some embodiments, a plurality of outputs may be produced by a plurality of acquisition parameter transforms, wherein the acquisition parameter transforms may comprise functions, neural networks, and/or numerical models. Each output produced by the one or more acquisition parameter transforms may be incorporated into deep neural network 324. In some embodiments, each output of each the plurality of acquisition parameter transforms may be input into deep neural network 324 via input layers 322.

Acquisition layers 306, comprise one or more feature maps/layers, each layer being of a same dimension as first image 310, thus enabling direct concatenation of the acquisition layers 306 and the first image 310. In some embodiments, acquisition parameter transform 304 may receive an acquisition parameter 302 comprising a single scalar value, and may map the single scalar value to a plurality of values, wherein the plurality of values is equal in number to a plurality of pixels in first image 310. In some embodiments, acquisition parameter transform 304 may map a plurality of acquisition parameters 302 to a plurality of acquisition parameter layers. In one example, if first image 310 comprises a 512×512×120 voxel volume, acquisition layers 306 may comprise one or more layers, each with dimensions of 512×512×120, thereby enabling direct concatenation with first image 310. By mapping acquisition parameters 302, which may comprise a scalar (a single acquisition parameter) or a vector (a plurality of acquisition parameters), to a higher dimensional space, information regarding spatial heterogeneity of blurring within an imaged space may be appended to first image 310 prior to being input into deep neural network 324, thereby providing deep neural network 324 with additional information regarding the spatial distribution of the first characteristic (blurring, artifacts, noise etc.) in first image 310, which may arise as a function of the one or more acquisition parameters 302.

Parameter map(s) 308 may comprise one or more parameters of an imaged space, wherein the imaged space corresponds to first image 310. In some embodiments, the parameter map(s) 308 may comprise one or more physical properties/parameters of the region imaged by first image 310. In one example, parameter map(s) 308 may comprise a magnetic field strength, a proton density field map, a density field map, a $B_1^+$ field inhomogeneity map, etc.

Input layers 322, comprising acquisition layers 306, parameter maps 308, and first image 310, may be propagated through the plurality of layers within deep neural network 324, to map intensity values of first image 310 to intensity values of second image 320. Deep neural network 324 comprises learned convolutional filters 314, and learned deconvolutional filters 318. Deep neural network 324 may further comprise one or more densely connected layers (not shown), and one or more pooling layers (not shown), one or more up sampling layers (not shown), and one or more ReLU layers (not shown), or any layers conventional in the art of machine learning.

Output of deep neural network 324 may be used to produce second image 320, which comprises an image of a same anatomical region as first image 310, but with having a second characteristic such as reduced artifacts, reduced blurring or noise, or image labels.

Figure 3:
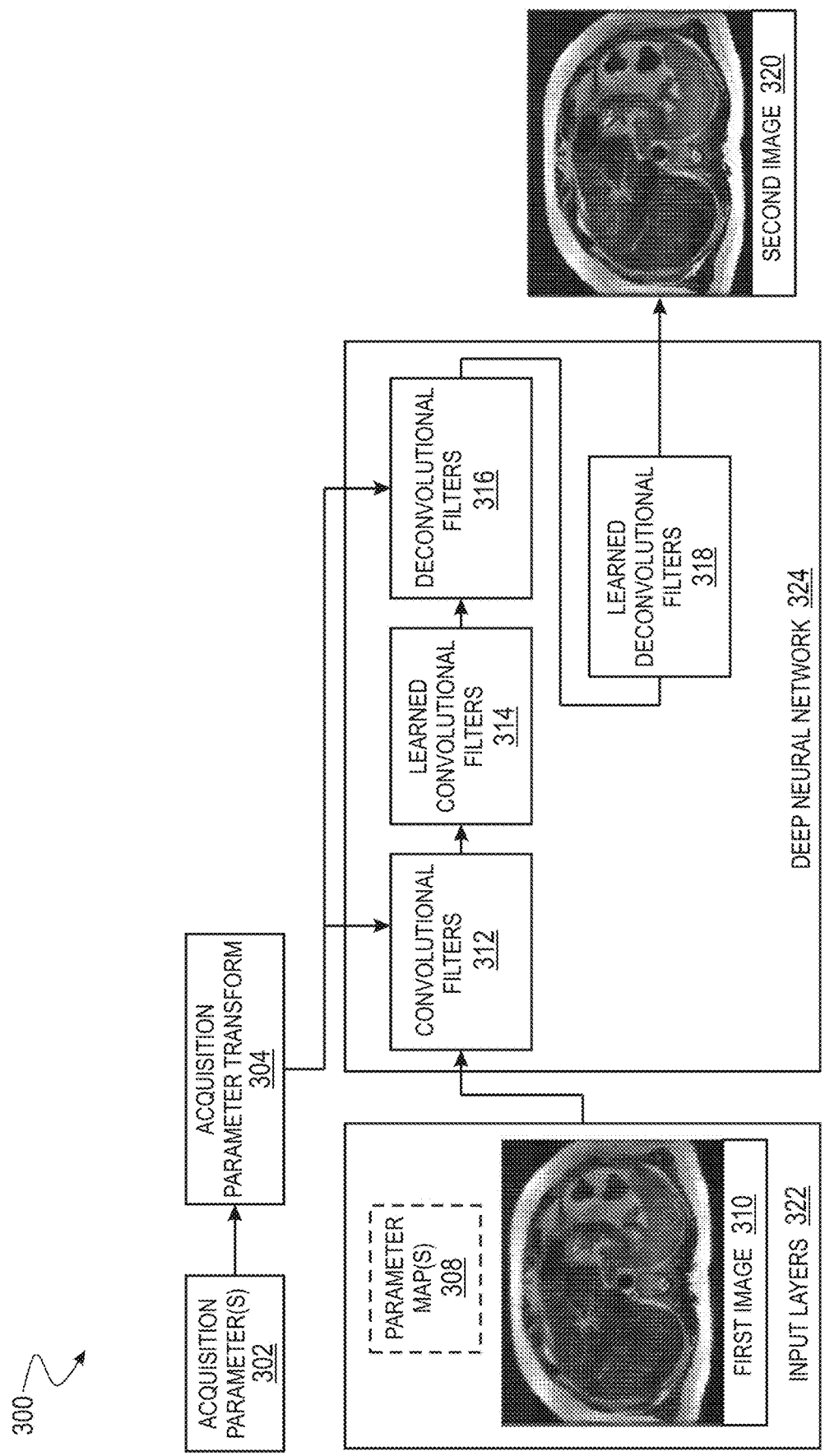
FIG. 3 is a schematic diagram illustrating the layout of a second embodiment of a deep neural network, and an acquisition parameter transform, which can be used in the image processing system of FIG. 1, according to an exemplary embodiment.

Turning to FIG. 3, a schematic of a second embodiment of a image processing method 300 is shown. Elements of processing method 300 previously introduced and discussed in FIG. 2 may retain their numbering. Image processing method 300 illustrates an embodiment wherein acquisition parameters 302 may be mapped via acquisition parameter transforms 304 to one or more values, which may then be used to set one or more convolutional and/or deconvolutional filter weights of deep neural network 324. The convolutional and/or deconvolutional filter weights set based on output of acquisition parameter transform 304 may enable the deep neural network to be informed of the types/extent of blurring present in blurred image 310. In one embodiment, by applying convolution and deconvolution filters specifically selected for a given set of acquisition parameters, one or more blurring artifacts may be more consistently and thoroughly removed from first image 310. By mapping acquisition parameters to output, and incorporating the output into deep neural network 324, the deep neural network 324 may receive at least partial information regarding the extent, type, and distribution of blurring artifacts in first image 310, as the blurring artifacts may arise as a function of one or more of the acquisition parameters.

Figure 6:
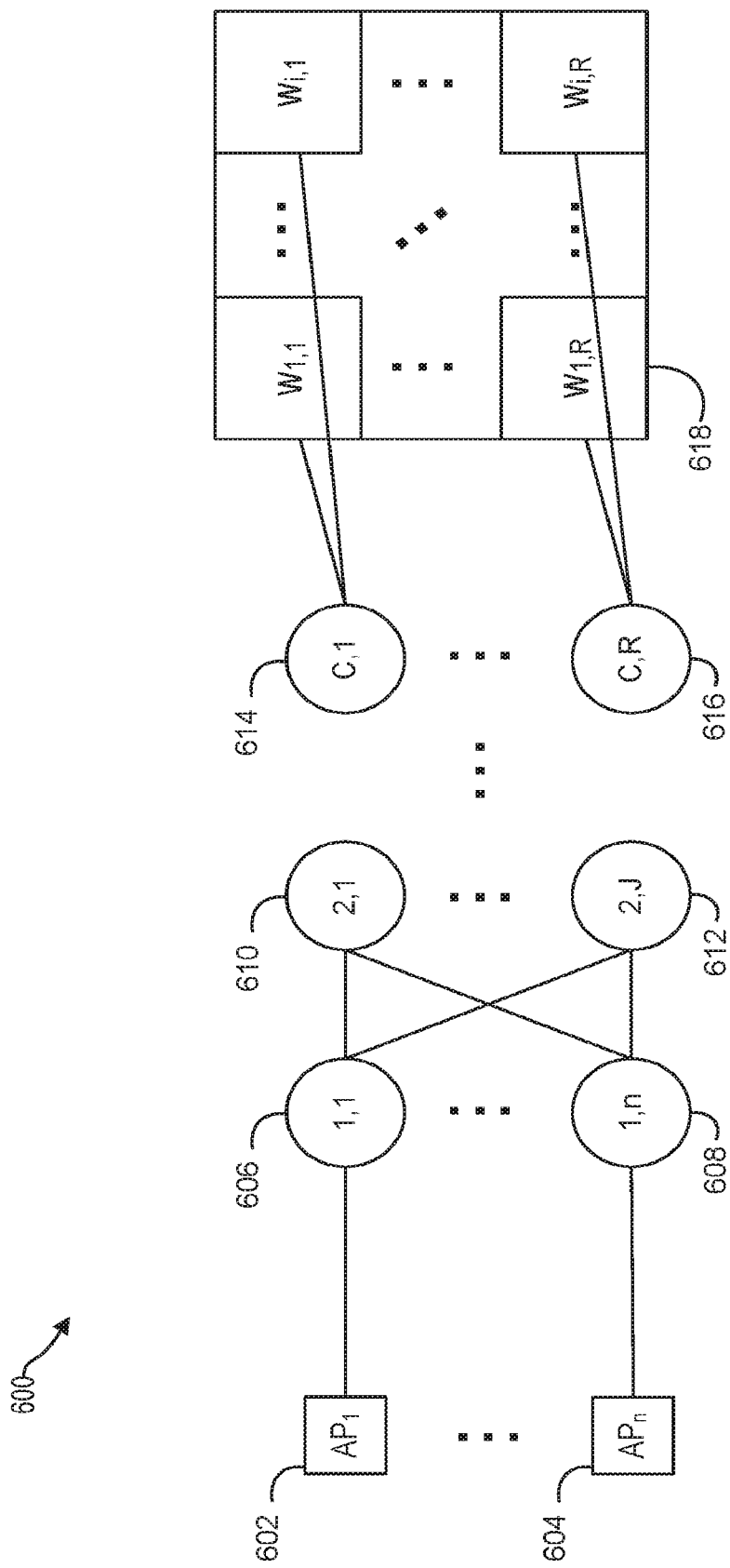
FIG. 6 is a schematic diagram illustrating an acquisition parameter transform architecture which can be used in the system of FIG. 1, according to an exemplary embodiment.

Image processing system 300 comprises acquisition parameter transforms 304, which receive acquisition parameters 302 as input, and map acquisition parameters 302 to one or more outputs, wherein the one or more outputs may be incorporated directly into deep neural network 324 by setting one or more parameters of deep neural network 324 based the output (see FIG. 6 for a more detailed discussion). In some embodiments, acquisition parameter transform 304 comprises a Fourier transform, and the first output of the acquisition parameter transform 304 comprises a point-spread-function corresponding to the blurring present in the first image 310 acquired with the one or more acquisition parameters 302.

Input layers 322 comprise first image 310, and optionally, parameter maps 308, which may include one or more parameter maps of an imaged space, such as a $B_1^+$ field, a $B_o$ field, a T1 map, a T2 map, a gradient nonlinearity map, an encoding error map, a motion map (where the motion/velocity may be estimated or measured), and so on. Input layers 322 are received by deep neural network 324, and mapped to second image 320.

Deep neural network 324 comprises convolutional filters 312 (set based on output from acquisition parameter transforms 304), learned convolutional filters 314 (learned during a training process), deconvolutional filters 316 (set based on output from acquisition parameter transform 304), and learned deconvolutional filters 318 (learned during a training process). By propagating data from input layers 322 through the convolutional and deconvolutional layers of deep neural network 324, second image 320 which is a deblurred image is produced.

Acquisition parameters 302 may comprise a vector or scalar, and may be input into acquisition parameter transforms 304. Acquisition parameter transforms 304 are configured to map acquisition parameters 302 to one or more outputs, which may be incorporated into deep neural network 324. Output from acquisition parameter transforms 304 may be incorporated into deep neural network 324 directly, by setting convolutional filters 312 and/or deconvolutional filters 316 based on the output of acquisition parameter transforms 304. In some embodiments, each output incorporated into deep neural network 324 may be produced by a separate acquisition parameter transform, such that there is a one to one correspondence between outputs and acquisition parameter transforms. In other embodiments, a single acquisition parameter transform may map acquisition parameters 302 to a plurality of outputs, wherein the plurality of outputs may each be incorporated into the deep neural network 324 via a plurality of distinct mechanisms/channels, such as though described in reference to FIG. 3.

Input layers 322, comprising parameter maps 308, and first image 310, may be propagated through the plurality of layers within deep neural network 324, to map intensity values of first image 310 to intensity values of second image 320. Deep neural network 324 comprises convolutional filters 312, learned convolutional filters 314, deconvolutional filters 316, and learned deconvolutional filters 318. Deep neural network 324 therefore comprises both parameters/layers learned during training using training data pairs, as well as parameters selected based on output from acquisition parameter transforms 304.

Deep neural network 324 comprises convolutional filters 312, and deconvolutional filters 316, which may be determined or selected based on output of acquisition parameter transforms 304. In some embodiments, acquisition parameter transforms 304 map one or more acquisition parameters to a plurality of values, wherein the plurality of values comprise a plurality of weights, and wherein one or more filters within convolutional filters 312 and/or deconvolutional filters 316 are set based on the plurality of weights. In some embodiments, one or more convolution filters 312 and/or one or more deconvolution filters 316 are set equal to the output of acquisition parameter transforms 304. In some embodiments, output of acquisition parameter transforms 304 may comprise a plurality of weights representing a point spread function, or an inverse mapping of a point spread function, determined based on one or more acquisition parameters input into acquisition parameter transforms 304.

Deep neural network 324 further comprises learned convolutional filters 314 and learned deconvolutional filters 318, which comprise filters learned during training of deep neural network 324. By including both parameters learned during a training process, as well as parameters selected/determined based on output from one or more acquisition parameter transforms 304, deep neural network 324 may be enabled to at least partially anticipate the types, extent, and/or distribution of blurring or other artifacts present in first image 310, which may enable more precise and consistent mapping of first image intensity values to second image intensity values, improving the diagnostic quality of one or more first images, and reducing the need to re-image a patient anatomical region.

In some embodiments, output from the plurality of acquisition parameter transforms may be input into deep neural network 324 both via input layers 322 and by setting one or more convolutional filters 312 or deconvolutional filters 316 based on the output. That is to say, embodiments shown in FIGS. 2 and 3 may be combined. The set of parameters transformed to be part of the input layer 322 may be the same as or different than the set of parameters transformed to be the filters 312/316. There may or may not be overlap. In some embodiments, the acquisition parameter transform 304 may map acquisition parameters 302 to a plurality of outputs, each being incorporated into the deep neural network 324 via a plurality of distinct mechanisms/channels, such as those described in more detail in FIGS. 5 and 6.

Figure 4:
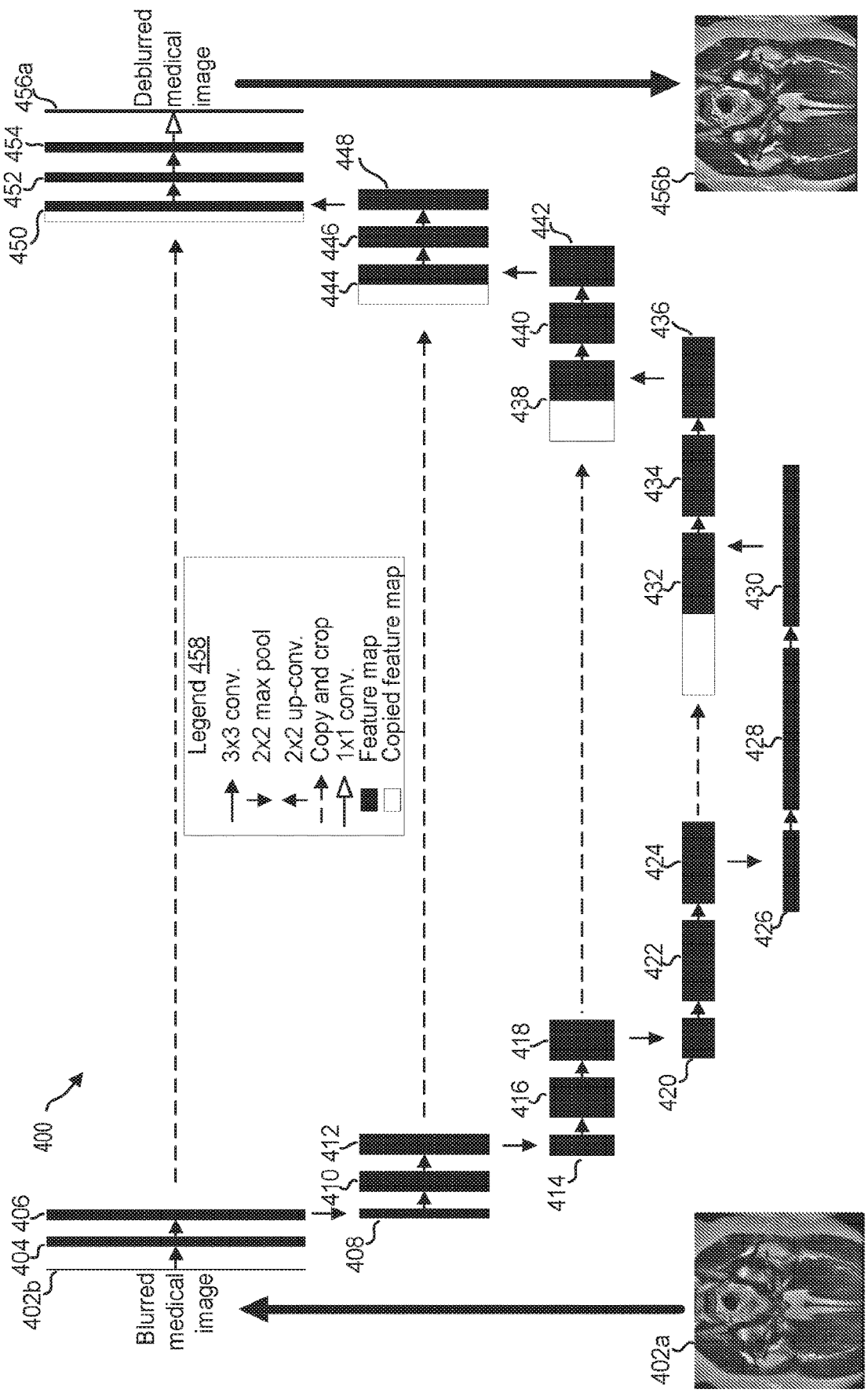
FIG. 4 is a schematic diagram illustrating an architecture of a deep neural network which can be used in the system of FIG. 1, according to an exemplary embodiment.

Turning to FIG. 4, CNN architecture 400 for mapping a first medical image to a second medical image based on output of an acquisition parameter transform is shown. CNN architecture 400 provides a more detailed illustration of a deep neural network, such as deep neural network 324, which may execute conversion of the first medical image characteristic into the second medical image characteristic. In some embodiments, a subset of the parameters of CNN architecture 400 may be selected/determined based on output of one or more acquisition parameter transforms, while other parameters of CNN architecture 400 may be learned using a training algorithm. For example, as indicated in image processing system 200 shown in FIG. 3, CNN architecture 400 may incorporate one or more outputs of the acquisition parameter transform.

CNN architecture 400 represents a U-net architecture, which may be divided into an autoencoder portion (descending portion, elements 402b-430) and an autodecoder portion (ascending portion, elements 432-456a). CNN architecture 400 is configured to receive medical images including one or more artifacts, which may comprise a magnetic resonance (MR) image, computed tomography (CT) image, positron emission tomography (PET) image, X-ray image, or ultrasound image. In one embodiment, CNN architecture 400 is configured to receive data from a first medical image of an anatomical region, such as first medical image 402a, comprising a plurality of pixels/voxels, and map the input first medical image data to a second medical image of the same anatomical region, such as second medical image 456b, based on output of an acquisition parameter transform. CNN architecture 400 comprises a series of mappings, from an input image tile 402b, which may be received by an input layer, through a plurality of feature maps, and finally to an output second medical image 456b, which may be produced based on output from output layer 456a. In some embodiments, CNN architecture 400 is configured to receive an output from a first acquisition parameter transform in the form of an acquisition parameter layer and concatenate the acquisition parameter layer data from first medical image 402a, wherein the concatenated input image data and acquisition parameter layer may be fed into input tile 402b and propagated through the layers of CNN architecture 400. In some embodiments, CNN architecture 400 is configured to set one or more convolutional filters, and/or one or more deconvolutional filters based on output of an acquisition parameter transform. CNN architecture 400 may be configured to receive a plurality of outputs from a corresponding plurality of acquisition parameter transforms, which may be incorporated into CNN architecture 400 according to one or more, of the above described embodiments.

The various elements comprising CNN architecture 400 are labeled in legend 458. As indicated by legend 458, CNN architecture 400 includes a plurality of feature maps (and/or copied feature maps) connected by one or more operations (indicated by arrows). The arrows/operations receive input from either an external file, or a previous feature map, and transform/map the received input to output to produce a next feature map. Each feature map may comprise a plurality of neurons, where in some embodiments, each neuron may receive input from a subset of neurons of a previous layer/feature map, and may compute a single output based on the received inputs, wherein the output may be propagated/mapped to a subset, or all, of the neurons in a next layer/feature map.

Feature maps may be described using the terms length, width, and depth, wherein each term refers to a number of neurons comprising the feature map (e.g., how many neurons long, how many neurons wide, and how many neurons deep, a specified feature map is). Length and width, as used in reference to a feature map, correspond to the spatial dimensions of the image being processed, and may in some cases correspond to a number of pixels/voxels of an image. Depth, as used in reference to a feature map may correspond to a number of features in each feature channel.

The transformations/mappings performed between each feature map are indicated by arrows, wherein each distinct type of arrow corresponds to a distinct type of transformation, as indicated by legend 458. Rightward pointing solid black arrows indicate 3×3 convolutions with a stride of 1, wherein output from a 3×3 grid of features of an immediately preceding feature map (wherein the 3×3 grid extends through all layers of the immediately preceding feature map) are mapped to a single feature, at a single depth, of a current feature map by performing a dot product between the outputs/activations of the 3×3 grid of feature channels and a 3×3 filter, (comprising 9 weights for each layer/unit of depth of the immediately preceding feature map). In some embodiments, the convolutional filter weights may be selected based on output from an acquisition parameter transform. In some embodiments the convolutional filter weights may be learned during a training process. The filters used to perform the 3×3 convolutions are herein referred to as convolution filters, convolutional filters, convolution kernels, or convolutional kernels.

Downward pointing arrows indicate 2×2 max pooling operations, wherein the max value from a 2×2 grid of feature channels at a single depth is propagated from an immediately preceding feature map to a single feature at a single depth of a current feature map, thereby resulting in an output feature map with a 4-fold reduction in spatial resolution as compared to the immediately preceding feature map. In one example, max pooling of a 2×2 grid of activations from an immediately preceding feature map, wherein the 2×2 grid of activations comprises (2, 1.4, 10, 4.4) produces an output of (10), as 10 is the maximum value of the activations within the 2×2 grid.

Upward pointing arrows indicate 2×2 up-convolutions of stride 2, which comprise performing a transpose convolution (also referred to herein as a deconvolution) using a deconvolution filter comprising a plurality of weights (filters used to perform transpose convolutions are herein also referred to as deconvolutional filters or deconvolution filters) mapping output from a single feature channel at each feature depth of an immediately preceding feature map to a 2×2 grid of features at a single feature depth in a current feature map, thereby increasing the spatial resolution of the immediately preceding feature map 4-fold.

Rightward pointing dash-tailed arrows indicate copying and cropping of a feature map for concatenation with another, later occurring, feature map. Cropping enables the dimensions of the copied feature map to match the dimensions of the feature map with which the copied feature map is to be concatenated. It will be appreciated that when the size of the first feature map being copied and the size of the second feature map to be concatenated with the first feature map, are equal, no cropping may be performed.

Rightward pointing arrows with hollow heads indicate a 1×1 convolution with stride 1, in which each feature channel in an immediately preceding feature map is mapped to a single feature channel of a current feature map, or in other words, wherein a 1-to-1 mapping of feature channels between an immediately preceding feature map and a current feature map occurs. Processing at every feature map may include the above-described convolutions and deconvolutions, as well as activations, where activation functions are non-linear functions that restrict the output values of the processing to a bounded range.

In addition to the operations indicated by the arrows within legend 458, CNN architecture 400 includes solid filled rectangles corresponding to feature maps, wherein feature maps comprise a height (top to bottom length as shown in FIG. 4, corresponds to a y spatial dimension in an x-y plane), width (not shown in FIG. 4, assumed equal in magnitude to height, corresponds to an x spatial dimension in an x-y plane), and depth (a left-right length as shown in FIG. 4, corresponds to the number of features within each feature channel). Likewise, CNN architecture 400 includes hollow (unfilled) rectangles, corresponding to copied and cropped feature maps, wherein copied feature maps comprise height (top to bottom length as shown in FIG. 4, corresponds to a y spatial dimension in an x-y plane), width (not shown in FIG. 4, assumed equal in magnitude to height, corresponds to an x spatial dimension in an x-y plane), and depth (a length from a left side to a right side as shown in FIG. 4, corresponds to the number of features within each feature channel).

Starting at input image tile 402*b* (herein also referred to as an input layer), data corresponding to a first medical image 402*a* is input and mapped to a first set of features. In some embodiments, first medical image 402*a*, which may comprise one or more layers corresponding to one or more features of the image (such as each intensity value of a multi-color image) may further comprise one or more concatenated acquisition parameter layers, produced by one or more acquisition parameter transforms. in some embodiments, acquisition parameter layers concatenated with first medical image 402*a* may indicate an expected/anticipated type, or intensity of blurring artifact at each pixel position of first medical image 402*a*. First medical image 402*a* may comprise a two-dimensional (2D) or three-dimensional (3D) image/map of a patient anatomical region. In some embodiments, the input data from first medical image 402*a* is pre-processed (e.g., normalized) before being processed by the neural network.

Output layer 456*a* may comprise an output layer of neurons, wherein each neuron may correspond to a pixel of a predicted second medical image 456*b* (or residual), wherein output of each neuron may correspond to the predicted pixel intensity in specified location within the output second medical image 456*b*.

In this way, CNN architecture 400 may enable mapping of a plurality of intensity values from a first medical image 402*a* to a plurality of intensity values of a second medical image 456*b*, wherein an extent of first characteristic of the first image such as blurring of one or more blurring artifacts present in first medical image 402*a* is reduced or eliminated in second medical image 456*b* to generate the second medical image 456*b* having a second characteristic. In some embodiments, CNN architecture 400 may enable mapping of one or more features of a pixel/voxel of a first medical image to one or more properties second medical image (e.g., labels, noise reduction etc.). CNN architecture 400 illustrates the feature map transformations which occur as an input image tile is propagated through the neuron layers of a convolutional neural network, to produce a second medical image. In one example, CNN architecture 400 may enable mapping of a plurality of pixel/voxel intensity values of the first medical image to a residual map, wherein the second medical image may be produced by combining the residual map with the input first medical image 402*a*, such as by pixelwise addition of values.

The weights (and biases) of the convolutional layers in CNN architecture 400 may be learned during training, and/or incorporated/set based on output from one or more acquisition parameter transforms, as will be discussed in more detail with reference to FIGS. 5, 6, and 7 below. CNN architecture 400 may be trained by calculating a difference between a predicted second medical image, and a ground truth second medical image, wherein the ground truth second medical image may comprise a medical image having second characteristic. The difference between the predicted second medical image and the ground truth second medical image may be used to determine a loss, and the loss may be back propagated through the neural network to update the weights (and biases) of each feature map using gradient descent, or any other method of parameter optimization known in the art of machine learning. A plurality of training data pairs, comprising first medical images and corresponding ground truth second medical images, may be used during the training process of CNN architecture 400.

Although not shown in FIG. 4, it will be appreciated that the current disclosure encompasses neural network architectures comprising one or more regularization layers, including batch normalization layers, dropout layers, Gaussian noise layers, and other regularization layers known in the art of machine learning which may be used during training to mitigate overfitting and increase training efficiency while reducing training duration.

It should be understood that CNN architecture 400 shown in FIG. 4 is for illustration, not for limitation. Any appropriate neural network can be used herein for generating a second medical image from a first medical image using output from one or more acquisition parameter transforms, such as ResNet, recurrent neural networks, General Regression Neural Network (GRNN), etc. One or more specific embodiments of the present disclosure are described above in order to provide a thorough understanding. These described embodiments are only examples of systems and methods for generating second medical images from first medical images using a deep neural network and one or more acquisition parameters and one or more acquisition parameter transforms. The skilled artisan will understand that specific details described in the embodiments can be modified when being placed into practice without deviating the spirit of the present disclosure.

Figure 5:
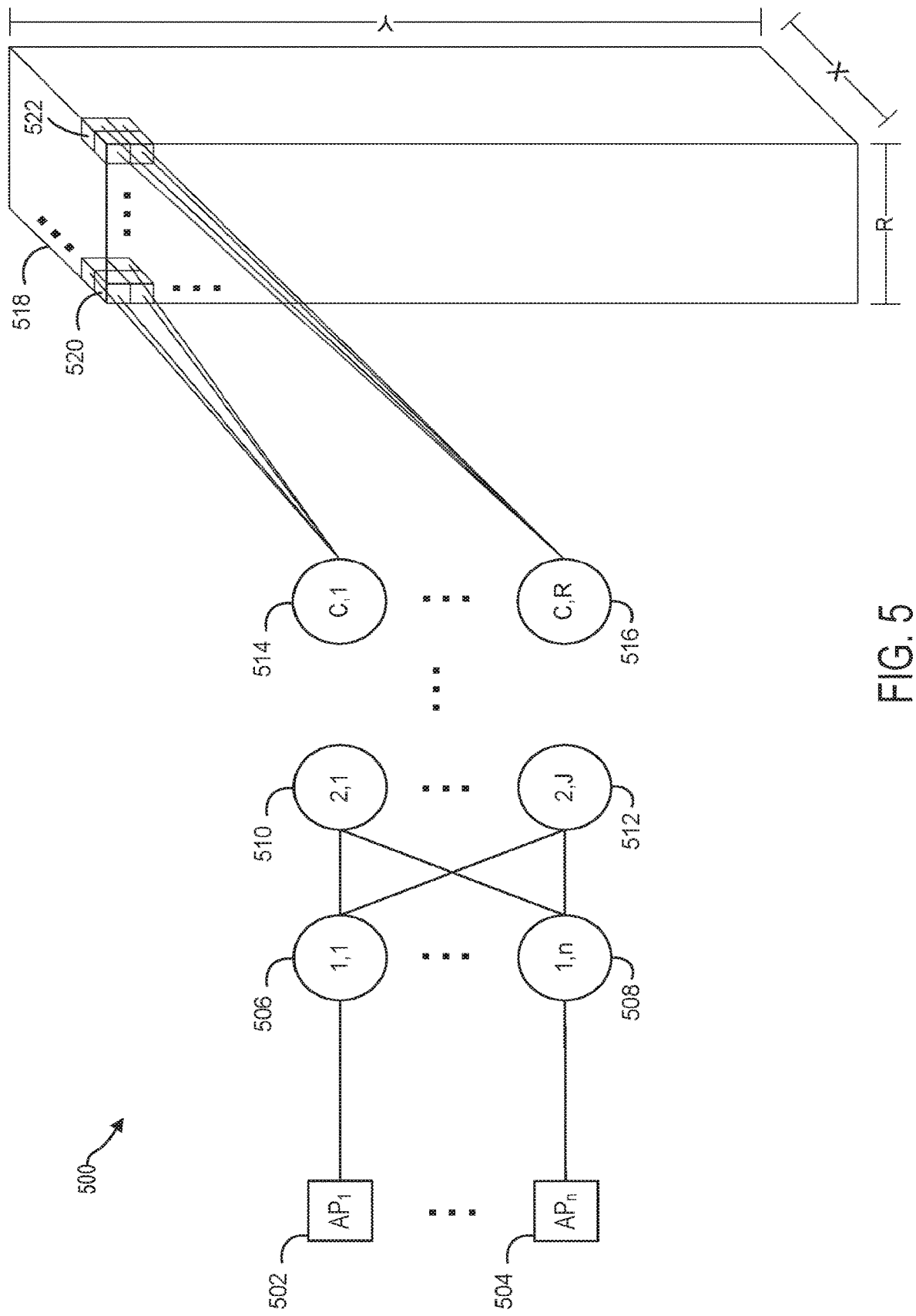
FIG. 5 is a schematic diagram illustrating an acquisition parameter transform architecture which can be used in the system of FIG. 1, according to an exemplary embodiment.

Turning to FIG. 5, acquisition parameter transform 500 is shown. Acquisition parameter transform 500 may be stored in acquisition parameter transform module 210 within image processing system 31, and may be used to map one or more acquisition parameters to one or more acquisition parameter layers, which may be concatenated with data from a first medical image and received by a deep neural network for mapping to a second medical image, as illustrated in image processing system 200 of FIG. 3. Acquisition parameter transform 500 is configured to map a vector of acquisition parameters (1D) to acquisition parameter layer 518 having a size and dimension matching the size and dimension of a first medical image. Acquisition parameter layer 518 may then be concatenated with data from the first medical image, and the combined first medical image data and acquisition parameter layer data may be input into a deep neural network, thereby providing the deep neural network with additional information regarding acquisition parameters of the blurred medical image, which may thereby inform the deep neural network of the types of blurring and/or extent of first characteristic of the first image such as blurring within the blurred medical image.

Acquisition parameter transform 500 is configured to receive a vector of n acquisition parameters (a 1D data object), comprising a first acquisition parameter $AP_1$ 502, through to an $n^{th}$ acquisition parameter Acquisition parameter transform 504, where n is a positive integer greater than 1. In some embodiments, acquisition parameter transform 500 may be configured to receive a single acquisition parameter, without deviating from the scope of the current disclosure. Each of the n acquisition parameters includes a corresponding input node/neuron in a first/input layer of acquisition parameter transform 500, such that a 1-to-1 correspondence between acquisition parameters and input nodes/neurons exists. As shown in acquisition parameter transform 500, the n acquisition parameters are matched by n nodes in the input layer. Each of node (1,1) 506 through to node (1, n) 508, may receive a single acquisition parameter as input, and map the single received acquisition parameter to output by passing the acquisition parameter through an activation function, wherein the activation function may include a bias term.

Output from each of input node (1,1) 506 through to input node (1, n) 508 is received by each of first hidden layer node (2,1) 510 through to first hidden layer node (2,J) 512, wherein J is a positive integer greater than 1, which may be equal to, or not equal to, n. In other words, output from each node of the first layer of acquisition parameter transform 500 is received by each node of the first hidden layer of acquisition parameter transform 500, and therefore the first hidden layer of the acquisition parameter transform 500 may be referred to as a fully connected layer. Each node of the first hidden layer of acquisition parameter transform 500 calculates a dot product using output from each node of the previous layer and each corresponding weight according to the below equation.

$$Y_j = f\left(\sum_{i=1}^{n} W_{ji} X_i + B_j\right)$$

Where $X_i$ is the i-th neuron of the preceding layer, $Y_j$ is the j-th neuron of the subsequent layer, $W_{ji}$ is the weight, and $B_j$ is the bias. In some embodiments, the activation function f is a rectified linear unit (ReLU) function, for example, plain ReLU function, leaky ReLU function, parametric ReLU function, etc.

Acquisition parameter transform 500 may include a positive integer number of fully connected hidden layers, analogous to the first hidden layer described above, and indicated by a horizontal ellipsis between the first hidden layer and the output layer. Acquisition parameter transform 500 may further include one or more dropout layers, or other regularization layers which may facilitated training and mitigate over fitting of the training data.

Acquisition parameter transform 500 further comprises output nodes (C,1) 514 through to output node (C,R) 516, wherein C designates that the output layer is the C-th layer of acquisition parameter transform 500, and that the C-th layer includes R nodes, wherein C and R are integers greater than 1. Each of output nodes (C,1) 514 through to output node (C,R) 516 receives weighted output from each node of an immediately preceding hidden layer, and computes an activation therefrom, analogous to the manner in which each hidden layer computes an activation based on the weighted input from each preceding node/neuron in an immediately preceding layer. Each activation value is then multiplied by a corresponding weight, and the result is used to produce acquisition parameter layer 518.

In the embodiment shown by FIG. 5, each output node includes X by Y weights (wherein the values of each of the X by Y weights may be different for each output node), which are used to map the activation value from each output node to a separate depth of acquisition parameter layer 518. The size of X and Y are chosen based on the size of the input image (the first medical image) with which acquisition parameter layer 518 is to be concatenated. For example, if a first medical image comprises a 3D image of 512 pixels by 512 pixels by 100 pixels, X may be set to 512, Y may be set to 512, and R may be set to 100.

In one embodiment, output node (C,1) 514, which represents the first output node of the output layer of acquisition parameter transform 500, produces a single output/activation value, and the output is then mapped to a first depth 520 of acquisition parameter layer 518 using X by Y weights. Similarly, output node (C,R) 516, the last node in the output layer, produces an activation value, which is propagated to a last, R-th, depth of acquisition parameter layer 518 using X by Y weights. The first medical image with which acquisition parameter layer 518 may be concatenated is of width X, height Y, and depth R, and therefore represents a 3D image, such as a 3D image of a patient anatomical structure. As a specific example, if R is equal to 3, X is equal to 10, and Y is equal to 10, the output layer will comprise 3 output nodes, and each of the 3 output nodes will produce 100 output values (by multiplying a single activation value for each output node by 100 associated weights), wherein a first depth of acquisition parameter layer 518 comprises the 100 output values produced by output node (C,1), a second depth of acquisition parameter layer 518 (not shown) comprises the 100 output values produced by output node (C,2) (not shown), and the third depth of acquisition parameter layer 518 comprises the 100 output values produced by output node (C,R). In this way, one or more acquisition parameters may be mapped to a data object of a same dimension and size as a first medical image, enabling direct concatenation of the acquisition parameter layer 518 with the first medical image prior to input of the first medical image data into a deep neural network.

It will be appreciated that the current disclosure encompasses acquisition parameter transforms with architectures other than that depicted in FIG. 5 for mapping one or more acquisition parameters to a data object of a same dimension and size as a first medical image. For example, each output node may produce values used in each depth of acquisition parameter layer 518. In another example, each output node of the output layer may output a single value to be incorporated into acquisition parameter layer 518, such that if acquisition parameter layer 518 comprises 100 total values, for example, the output layer comprises 100 output nodes. In some embodiments, acquisition parameter layer 518 may be of a same dimension, but of a smaller size than the first medical image.

Turning to FIG. 6, acquisition parameter transform 600 is shown. Acquisition parameter transform 600 may be stored in acquisition parameter transform module 210 within image processing system 31, and may be used to map one or more acquisition parameters to one or more convolutional or deconvolutional filters, which may be incorporated into one or more convolutional and/or deconvolutional layers of a deep neural network, respectively. Acquisition parameter transform 600 is configured to map a vector of acquisition parameters (1D) to a plurality of filter weights, wherein the filter weights may be used in one or more convolutional and/or deconvolutional filters of a deep neural network, such as deep neural network 324 shown in FIG. 3, or CNN architecture 400 shown in FIG. 4.

Acquisition parameter transform 600 is configured to receive a vector of n acquisition parameters (a 1D data object), comprising a first acquisition parameter AP$_1$ 602, through to an n$^{th}$ acquisition parameter Acquisition parameter transform 604, where n is a positive integer greater than 1. In some embodiments, acquisition parameter transform 600 may be configured to receive a single acquisition parameter, without deviating from the scope of the current disclosure. Each of the n acquisition parameters includes a corresponding input node/neuron in a first/input layer of acquisition parameter transform 600, such that a 1-to-1 correspondence between acquisition parameters and input nodes/neurons exists. As shown in acquisition parameter transform 600, the n acquisition parameters are matched by n nodes in the input layer. Each of node (1,1) 606 through to node (1, n) 608, may receive a single acquisition parameter as input, and may map the single received acquisition parameter to output by passing the acquisition parameter through an activation function, wherein the activation function may include a bias term.

Output from each of input node (1,1) 606 through to input node (1, n) 608 is received by each of first hidden layer node (2,1) 610 through to first hidden layer node (2, J) 612, wherein J is a positive integer greater than 1, which may be equal to, or not equal to, n. In other words, output from each node of the first layer of acquisition parameter transform 600 is received by each node of the first hidden layer of acquisition parameter transform 600, and therefore the first hidden layer of the acquisition parameter transform 600 may be referred to as a fully connected layer. Each node of the first hidden layer of acquisition parameter transform 600 calculates a dot product using output from each node of the previous layer and each corresponding weight according to the below equation.

$$Y_j = f\left(\sum_{i=1}^{n} W_{ji} X_i + B_j\right)$$

Where $X_i$ is the i-th neuron of the preceding layer, $Y_j$ is the j-th neuron of the subsequent layer, $W_{ji}$ is the weight, and $B_j$ is the bias. In some embodiments, the activation function $f$ is a rectified linear unit (ReLU) function, for example, plain ReLU function, leaky ReLU function, parametric ReLU function, etc.

Acquisition parameter transform 600 may include a positive integer number of fully connected hidden layers, analogous to the first hidden layer described above, and indicated by a horizontal ellipsis between the first hidden layer and the output layer. Acquisition parameter transform 600 may further include one or more dropout layers, or other regularization layers which may facilitated training and mitigate over fitting of the training data.

Acquisition parameter transform 600 further comprises first output node (C,1) 614 through to last output node (C,R) 616, wherein C designates that the output layer is the C-th layer of acquisition parameter transform 600, and that the C-th layer includes R nodes, wherein C and R are integers greater than 1, which may or may not be equal to each other. Each of first output node (C,1) 614 through to last output node (C,R) 616 receives weighted output from each node of an immediately preceding hidden layer, and computes an activation value therefrom, analogous to the manner in which each hidden layer computes an activation based on the weighted input from each node/neuron in an immediately preceding layer. Each activation value is then multiplied by a corresponding weight, and the result is used to produce filter 618, wherein filter 618 comprises a convolutional and/or deconvolutional filter having i by R weights (that is, filter 618 comprises i columns and R rows).

In the embodiment shown by FIG. 6, each of the R output nodes includes i associated weights, wherein the i associated weights are used to map the activation value from each output node to a i distinct filter weights, such that each output node produces the filter weights in a single row of filter 618. It will be appreciated that, although shown as comprising a single depth, filter 618 may comprise any positive integer number of depths, such that filter 618 may comprise i×R×D weights, wherein D is the depth of the filter. In one embodiment, filter 618 comprises a 3×3 convolutional filter with depth of 1, such that the output layer of acquisition parameter transform 600 comprises 3 output nodes, each with 3 distinct weights, mapping the 3 activation values to 9 total filter weights.

Filter 618 may be incorporated into one or more convolutional and/or deconvolutional layers of a deep neural network, such as deep neural network 324 of FIG. 3, or CNN architecture 400 of FIG. 4, and may enable the deep neural network to more consistently deconvolve or converter a first medical image into a second medical image.

It will be appreciated that the current disclosure encompasses acquisition parameter transforms with architectures other than that depicted in FIG. 6 for mapping one or more acquisition parameters to convolutional and/or deconvolutional filters. For example, each output node may produce values used in each depth of filter 618. In another example, each output node of the output layer may output a single value to be incorporated into filter 618, such that if filter 618 comprises 27 total values, for example, the output layer comprises 27 output nodes.

The deep neural network(s) may be trained by using a plurality pairs of first medical images having first characteristic (e.g., blurriness) and corresponding second images having second characteristics (e.g., sharp or pristine images). In some embodiments, in a first-second characteristic medical image pair, the first medical image is reconstructed from the acquired raw data by a medical device while the second image is obtained by processing the first image through known conversion methods (e.g., known reconstruction techniques, classification, denoising/deblurring methods) or any combination thereof. In some embodiments, in a first-second medical image pair, the first and second images are acquired for the same anatomical region but with different acquisition parameters. The first images are used as input to the deep neural network and the second images are used as the ground truth for reference.

In one embodiment, a difference between the deblurred medical image output by the deep neural network and the corresponding sharp medical image is determined and backpropagated through the layers/feature maps of the deep neural network.

In some embodiments, parameters of the deep neural network and the one or more acquisition parameter transforms are adjusted in a single phase, wherein the difference between the predicted second medical image and the ground truth second medical image is used to adjust parameters throughout both the deep neural network and the acquisition parameter transform in a single phase. Alternatively, the deep neural network and the one or more acquisition parameter transforms may be trained in alternating phases, wherein during a first phase, parameters of the deep neural network are held fixed, while parameters of the one or more acquisition parameter transforms is adjusted based on the training data. During a second phase, parameters of the one or more acquisition parameter transforms may be held fixed while the parameters of the deep neural network are adjusted based on the training data. Alternation of training phases may continue until a threshold accuracy of prediction is met, or until the parameters of the one or more acquisition parameter transforms and the deep neural network have converged (that is, when a rate of change of the parameters of the one or more acquisition parameter transforms and the deep neural network have a rate of a change per round which is less than a pre-determined threshold rate of change).

Figure 7:
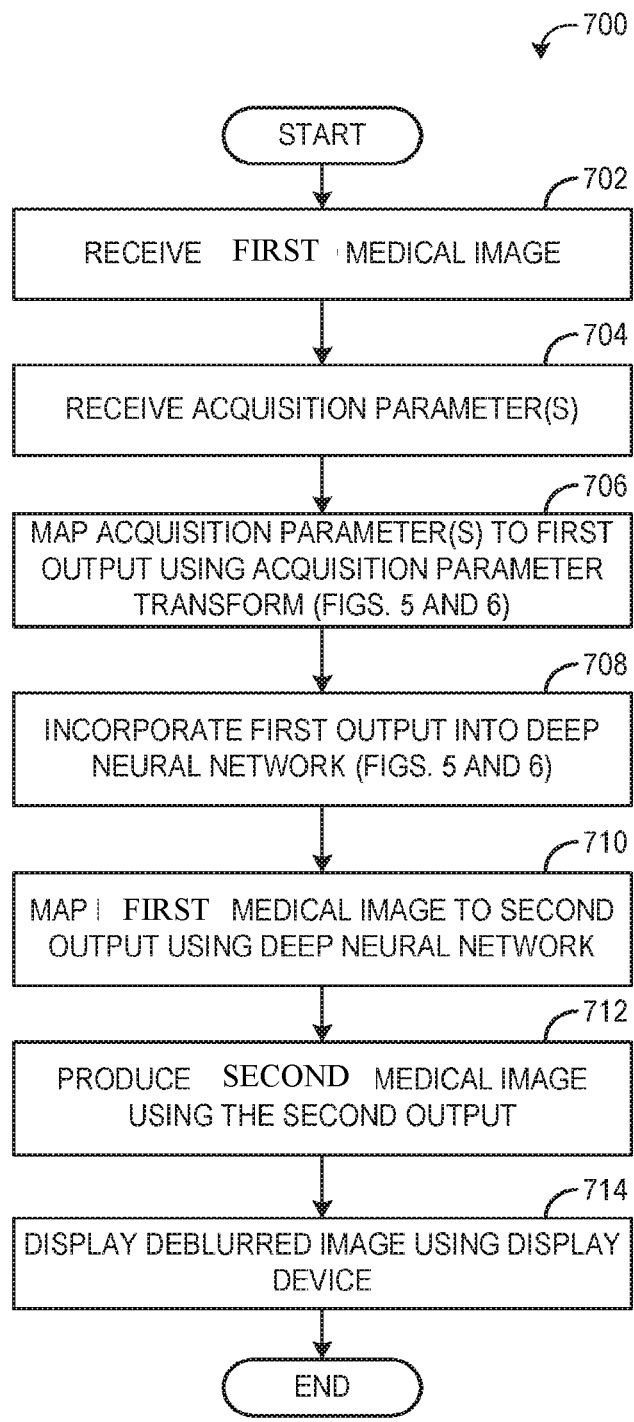
FIG. 7 is a flow chart illustrating a method for deblurring a medical image using a deep neural network and an acquisition parameter transform, according to an exemplary embodiment.

Referring to FIG. 7, a flow chart of a method 700 for processing a first medical image using a deep neural network and one or more acquisition parameter transforms is shown, according to an exemplary embodiment. Post processing a second medical image is generated. The first image includes noisy image, image having artifacts, unsegmented image or original image, unlabeled image and the second image includes denoised image, artifact removed image, segmented image, labeled image etc. Method 700 may be implemented by the image processing system 100, an edge device connected to the imaging device, a cloud in communication with the imaging device, or any appropriate combination thereof.

Method 700 begins at operation 702, wherein a first medical image having first characteristic is received. In some embodiments, the image processing system receives the first medical image from an imaging system via communicative coupling, such as over a network. In some embodiments, the image processing system receives the first medical image from non-transitory memory. Although described with reference to a single first medical image for simplicity, it will be appreciated that the current disclosure provides for mapping a plurality of first medical images to a plurality (or to a single) second medical image having second characteristics. For example, a number of input layers corresponding to a number of blurred medical images may be increased to accommodate the number of blurred medical images to be deblurred, without deviating from the disclosure herein provided.

At operation 704, one or more acquisition parameters associated with the first medical image(s) are received. Acquisition parameters associated with, or corresponding to, a first medical image may comprise one or more settings, parameters, or conditions, used or present during acquisition of the first medical image. In some embodiments, acquisition parameters comprise settings of an imaging device used during a scan/image acquisition. In some embodiments, acquisition parameters comprise one or more attributes of the patient anatomical region imaged during a scan/image acquisition. Acquisition parameters may be stored with, or indexed by, the medical image(s) with which they correspond, such that rapid and computationally efficient retrieval of the one or more acquisition parameters associated with a first medical image may be enabled.

At operation 706 the received acquisition parameters are input into one or more trained acquisition parameter transforms which maps the acquisition parameters to a first output. In some embodiments the first output may comprise one or more acquisition parameter layers, which may be concatenated with the first medical image, and input into a deep neural network. In some embodiments the first output may comprise one or more values, which may be used to set one or more weights in a convolution filter and/or deconvolution filter of a deep neural network. In some embodiments, the output may be used for both the input layer and the weights of the filters. In some embodiments, the acquisition parameter transform comprises an input layer configured to receive the acquisition parameter(s), an output layer configured to produce the first output, and at least one fully connected layer between the input layer and the output layer. In some embodiments, the first medical image comprises a number of pixels or voxels, and the first output from the acquisition parameter transform comprises a number of output values, wherein the number of output values is evenly divisible by the number of pixels or voxels, such that an integer number of output values from the first output may be concatenated with data from each pixel or voxel of the first input image. See FIGS. 5 and 6 for a more detailed description of the acquisition parameter transforms and the types of output which may be produced therefrom. Although acquisition parameter transforms are herein described as comprising learnable parameters, it will be appreciated that the current disclosure further provides for acquisition parameter transforms comprising fixed models/simulations, wherein the parameters are fixed, such as according to a physical model or equation, which may be employed to map one or more acquisition parameters to a first output having the properties herein described.

At operation 708 the first output from the one or more acquisition parameter transforms is incorporated into a deep neural network, such as deep neural network 324, or CNN architecture 400. Incorporation of the first output from the one or more acquisition parameter transforms into a deep neural network may occur as described with reference to FIGS. 3, 4, 5, and 6, and as such, will be described briefly here. In some embodiments, incorporating the first output with the deep neural network comprises concatenating the first output with a parameter map and the first medical image, wherein the parameter map may comprise a map of one or more physical or physiological properties of an imaged space/imaged anatomical region, and inputting the first output, the parameter map, and the first medical image, into an input layer of the trained deep neural network. In some embodiments, incorporating the first output with the deep neural network comprises concatenating the first output with the first medical image and inputting both the first output and the first medical image into an input layer of the trained deep neural network. In some embodiments, the first output comprises a plurality of values, and incorporating the first output into the deep neural network comprises setting a plurality of weights in the trained deep neural network based on the plurality of values, wherein in some embodiments the deep neural network comprises a CNN, and the plurality of weights comprise a deconvolution filter of a deconvolutional layer or a convolution filter of a convolutional layer of the convolutional neural network. In some embodiments, the output may be used for both the input layer and the weights of the filters.

At operation 710, the first medical image is mapped to a second output using the deep neural network. Mapping the first medical image to the second output comprises inputting data from the first medical image, including any additional concatenated data, into an input layer/input tile of a deep neural network, and propagating the input data through each layer of the deep neural network until a second output is produced by an output layer of the deep neural network. In some embodiments, the deep neural network comprises a convolutional neural network, wherein one or more filters (convolutional or deconvolutional) are set based on the first output from the one or more acquisition parameter transforms, and the one or more filters are applied to the data from the first medical image as the data propagates through the deep neural network.

At operation 712, a second medical image is generated using the second output from the deep neural network. In some embodiments, the second output comprises a residual map, and producing the second medical image from the first medical image using the second output comprises combining the residual map with the first medical image to produce the second medical image. In other words, the residual map may comprises a plurality of values, one or each pixel or voxel of the input first medical image, which describes the intensity difference between each pixel or voxel of the first image and the intensity of each pixel or voxel of a corresponding second medical image. Combining the residual map with the first medical image to produce the second medical image may comprise pixelwise addition of values between the residual map and the first medical image. In some embodiments, the second output from the deep neural network comprises a map of pixel/voxel intensity values of the second medical image. At operation 714, the image processing system displays the second medical image via a display device.

In this way, method 700 enables generation of second medical image from a first medical image in a time efficient and more consistent manner, by integrating information regarding one or more acquisition parameters, using one or more acquisition parameter transforms, into the deep neural network used to produce the second medical image.

Figure 8:
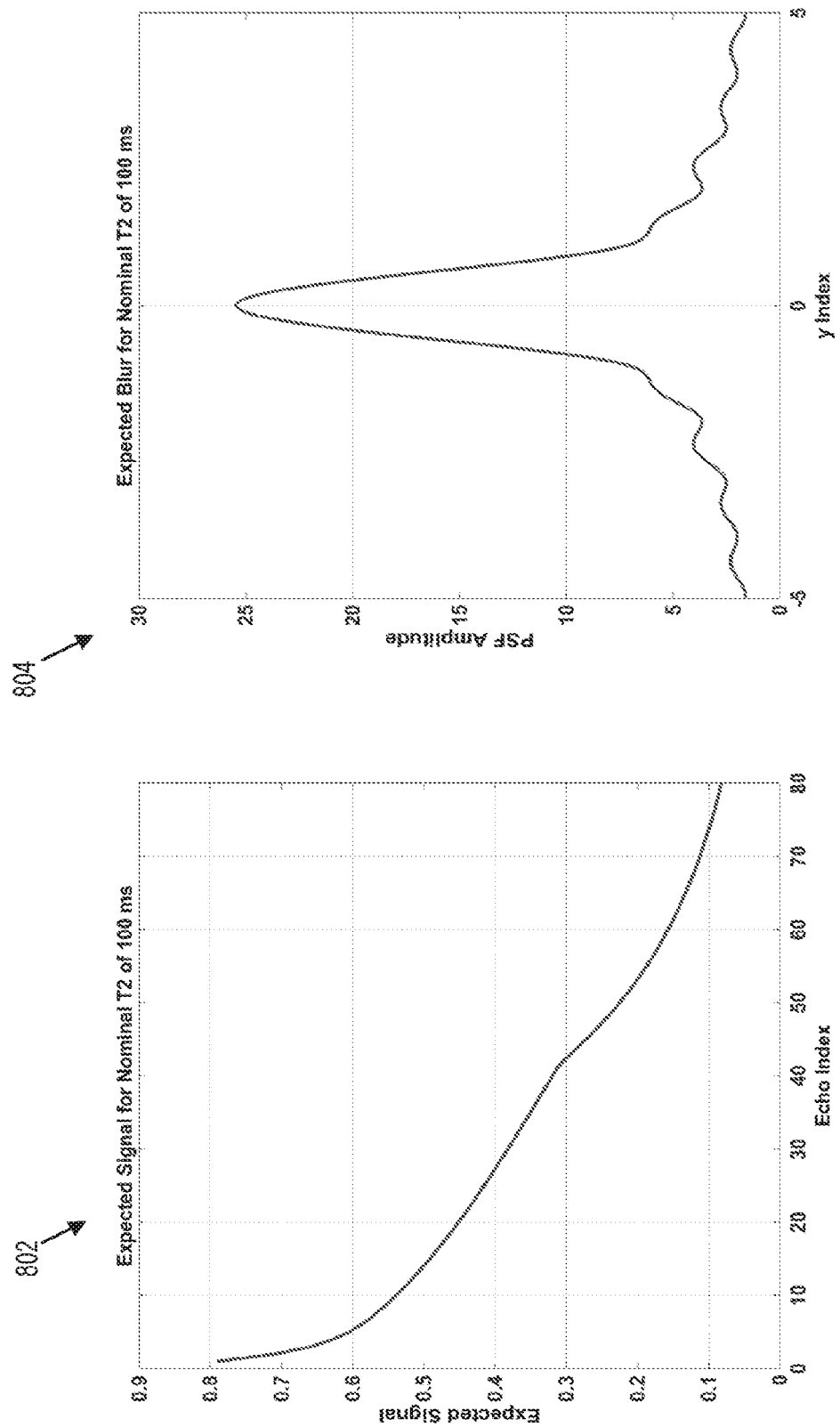
FIG. 8 shows signal decay due to T2 and a corresponding point spread function.

Turning to FIG. 8, one example of a point spread function 804, and a corresponding transverse magnetization signal decay 802 is shown. The nominal signal decay 802 is fit with a model for a nominal T2 value (or some fractional combination of T2 values, which may result in a multi-exponential decay) based on one or more acquisition parameters, such as echo spacing, echo train length, sample schedule/order, and filtering of the raw k-space data. Transforming signal decay 802 from the frequency domain to the spatial domain may be accomplished via Fourier-transform, resulting in point spread function 804. In some embodiments, inverting signal decay 802 prior to transformation to the spatial domain may be used to produce the weights of one or more convolution or deconvolution kernels, which may be used, for example, at layers 312 and/or 316.

In some embodiments, point spread functions similar to point spread function 804 may be predicted by an acquisition parameter transform based on one or more acquisition parameters, and inverted, to produce a deconvolution filter which may be incorporated into a deep neural network and used to deconvolve a first medical image such as a blurred medical image. As blurring may be modeled as a convolution of a point spread function over a sharp image, deconvolving a blurred image using an inverted point spread function may enable consistent deblurring, particularly when the inverse point spread function is predicted based on acquisition parameters used during acquisition of a blurred medical image to be deblurred, instead of a generic point spread function.

In some embodiments, point spread function 804 may be produced by an analytical model as a function of one or more acquisition parameters.

Figure 9:
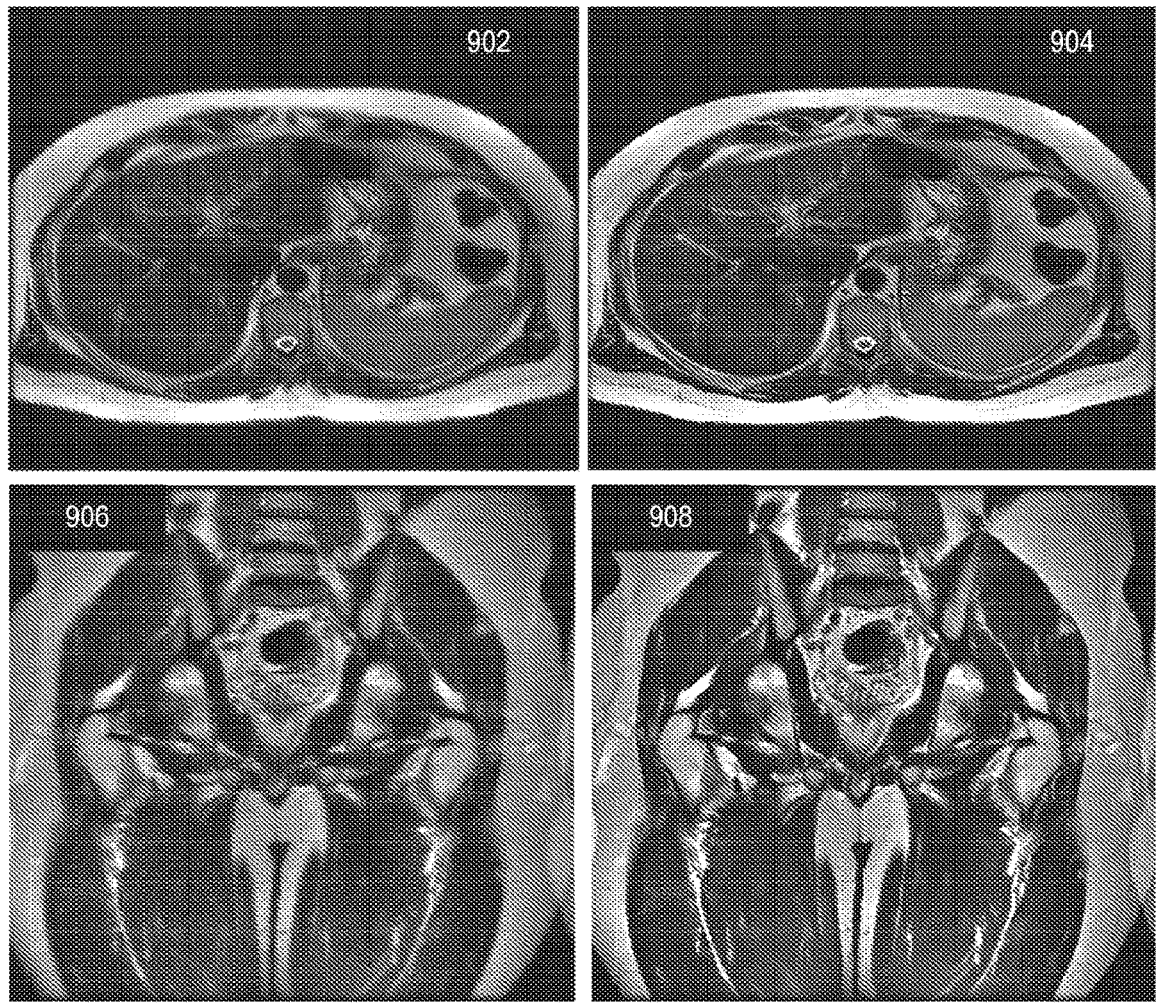
FIG. 9 shows a comparison between blurred and deblurred medical images, according to an exemplary embodiment.

Turning to FIG. 9, examples are shown of first images that consists of blurred medical images and corresponding second images that consists of deblurred medical images, produced according to embodiments of the present disclosure. Blurred medical image 902, comprises an MR cross sectional image of human abdomen, and includes one or more blurring artifacts which reduce the sharpness of the various boundaries of the imaged anatomical regions. Sharp/deblurred medical image 904 comprises the same anatomical regions as depicted in blurred medical image 902, however sharp medical image 904 has been deblurred according to a deblurring method herein disclosed, such as method 700. As can be seen, the boundaries of the anatomical regions imaged in sharp medical image 904 are more sharp/less smeared, than the corresponding anatomical regions imaged in blurred medical image 902, which may enable more precise analysis and/or diagnosis based on the imaged anatomical regions. Further, the extent of blurring within blurred medical image 902 varies throughout the image, however deblurred medical image 904 shows a consistent degree of deblurring throughout.

Blurred medical image 906, comprises an MR cross sectional image of a human hip region, and includes one or more blurring artifacts which reduce the sharpness of the various boundaries of the imaged anatomical regions. Sharp/deblurred medical image 908 comprises the same anatomical regions as depicted in blurred medical image 906, however sharp medical image 908 has been deblurred according to a deblurring method herein disclosed, such as method 700. As can be seen, fine structures in the tissue and bone in the anatomical regions captured in deblurred medical image 908 are more clearly defined, than the corresponding fine structures in blurred medical image 906. Thus, deblurred medical image 908 may enable more precise analysis and/or diagnosis.

Although FIG. 9 provides two specific examples of anatomical regions, imaged via MRI, which may be deblurred using the systems and methods disclosed herein, it will be appreciated that the current disclosure provides for converting any medical image having first characteristics of any anatomical regions into. In one embodiment, a single deep neural network may be trained using training data pairs of substantially similar anatomical regions, captured/acquired using a single medical imaging modality, and the deep neural network may be employed in deblurring, denoising, classifying of medical images of anatomical regions substantially similar to those of the training data pairs. In other embodiments, a single deep neural network may be trained using training data pairs comprising a plurality of distinct medical imaging modalities of distinct anatomical regions, thereby producing a more generalized deep neural network which may enable, for example, deblurring of a wide range of medical images of various anatomical regions using a single deep neural network.

The technical effect of incorporating one or more acquisition parameters into a trained deep neural network is that the deep neural network may receive at least partial information regarding the type, extent, and/or spatial distribution of blurring in a blurred medical image, enabling the trained deep neural network to selectively deblur the received blurred medical image with a higher degree of consistency.

One or more specific embodiments of the present disclosure are described above in order to provide a thorough understanding. These described embodiments are only examples of systems and methods for selectively denoising a medical image by using a deep neural network. The skilled artisan will understand that specific details described in the embodiments can be modified when being placed into practice without deviating the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A medical image processing method comprising:
receiving a first medical image having a first characteristic and one or more acquisition parameters corresponding to acquisition of the first medical image;
incorporating the one or more acquisition parameters into a trained deep neural network; and
mapping, by the trained deep neural network, the first medical image to a second medical image having a second characteristic.

2. The method of claim 1, wherein the first image comprises an image having an artifact and the second image comprises a reduced artifact image.

3. The method of claim 1, wherein the artifact comprises blurring, ringing, or ghosting effect in the first image.

4. The method of claim 1, wherein the first image comprises an unsegmented image and the second image comprises a segmented image.

5. The method of claim 1, wherein the first image comprises an unlabeled image and the second image comprises a labeled image.

6. The method of claim 1, wherein incorporating the one or more acquisition parameters into the trained deep neural network comprises providing a preprocessing layer.

7. The method of claim 6, wherein the preprocessing layer generates images with estimated corrections.

8. The method of claim 6, wherein incorporating the one or more acquisition parameters into the trained deep neural network comprises:
mapping the one or more acquisition parameters to one or more weights; and
incorporating the one or more weights into the one or more trained deep neural networks.

9. The method of claim 8, wherein the trained deep neural network comprises a convolutional neural network, and wherein incorporating the one or more weights into the trained deep neural network comprises setting one or more convolutional filter weights and/or one or more deconvolutional filter weights based on the one or more weights.

10. The method of claim 1, wherein incorporating the one or more acquisition parameters into the trained deep neural network comprises:
mapping the one or more acquisition parameters to a plurality of values;
concatenating the plurality of values with a plurality of pixel or voxel data of the first medical image; and
inputting the plurality of values and the plurality of pixel or voxel data of the first medical image into an input layer of the trained deep neural network.

11. The method of claim 1, further comprising training the deep neural network by using a plurality pairs of sharp medical images and corresponding first medical images.

12. The method of claim 1, wherein the medical image is one of a magnetic resonance (MR) image, computed tomography (CT) image, positron emission tomography (PET) image, X-ray image, or ultrasound image.

13. The method of claim 1, wherein the one or more acquisition parameters comprise one or more of echo train length, echo spacing, flip angle, voxel spatial dimension, sampling pattern, acquisition order, acceleration factor, physiological state, image reconstruction parameter, detector size, detector number, source-to-detector distance, collimator geometry, slice thickness, dose, detector type, detector geometry, ring radius, positron range, depth/line of response, transducer geometry, central frequency, ringdown, spatial pulse length, focal depth, beam apodization, or side lobe amplitude.

14. A medical image processing system comprising:
a memory storing a trained deep neural network and an acquisition parameter transform; and
a processor communicably coupled to the memory and configured to:
receive a first medical image having a first characteristic;
receive one or more acquisition parameters, wherein the one or more acquisition parameters correspond to acquisition of the first medical image;
map the acquisition parameter to a first output using the acquisition parameter transform;
incorporate the first output into the trained deep neural network;
map the first medical image to a second output using the trained deep neural network; and
produce a second medical image having a second characteristic using the second output.

15. The system of claim 14, wherein the first image comprises an image having an artifact and the second image comprises a reduced artifact image.

16. The method of claim 15, wherein the artifact comprises blurring, ringing, or ghosting effect in the first image.

17. The system of claim 14, wherein the trained deep neural network is a trained convolutional neural network, wherein the first output is one or more weights, and wherein the processor is configured to incorporate the first output into the trained deep neural network by setting one or more convolutional filter weights and/or one or more deconvolutional filter weights of the convolutional neural network based on the one or more weights.

18. The system of claim 17, wherein the acquisition parameter transform comprises an analytical model which maps the one or more acquisition parameters to the one or more weights.

19. The system of claim 18, wherein the analytical model is based on a point-spread-function.

20. The system of claim 14, wherein the first output is a plurality of values, and wherein the processor is configured to incorporate the first output into the trained deep neural network by conconcatenating the plurality of values with a plurality of pixel or voxel data of the first medical image as input to the trained deep neural network.

21. The system of claim 20, wherein the acquisition parameter transform comprises another trained deep neural network that maps the one or more acquisition parameters to the plurality of values.

* * * * *